US012689699B2

(12) United States Patent
Kaibara

(10) Patent No.: US 12,689,699 B2
(45) Date of Patent: Jul. 21, 2026

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Kohei Kaibara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/449,685

(22) Filed: Aug. 14, 2023

(65) Prior Publication Data

US 2024/0323301 A1 Sep. 26, 2024

(30) Foreign Application Priority Data

Mar. 23, 2023 (JP) ................................. 2023-046325

(51) Int. Cl.
H04N 1/32 (2006.01)
H04N 1/333 (2006.01)

(52) U.S. Cl.
CPC ..... H04N 1/32454 (2013.01); H04N 1/33361 (2013.01)

(58) Field of Classification Search
None
See application file for complete search history.

(56) References Cited

U.S. PATENT DOCUMENTS

| 9,654,664 | B2 * | 5/2017 | Okamoto | ........... H04N 1/32101 |
| 2019/0068824 | A1 * | 2/2019 | Kubota et al. | ..... H04N 1/32368 |
| 2022/0407982 | A1 * | 12/2022 | Niwa | ................. H04N 1/32096 |

FOREIGN PATENT DOCUMENTS

| JP | 2017135561 | | 8/2017 |
| JP | 2017135561 | A * | 8/2017 |

* cited by examiner

*Primary Examiner* — Twyler L Haskins
(74) *Attorney, Agent, or Firm* — JCIPRNET

(57) ABSTRACT

An information processing apparatus includes a processor configured to: acquire reception information as information indicating a reception date and a reception time of transmitted image data; transmit first information, serving as information including the reception date in the reception information, to a storage destination if the reception time in the acquired reception information has not passed a predetermined time, and transmit second information, serving as information including any date on or after a following day of the reception date, to the storage destination if the reception time has passed the predetermined time, the first information and the second information each serving as information indicating a storage location in the storage destination where the image data is stored when the image data is transferred to the storage destination; and transmit the first information instead of transmitting the second information when a predetermined time condition set based on communication status information is satisfied during transferring of the image data if the reception time has passed the predetermined time and the communication status information indicating a communication status during reception of the image data is acquired.

12 Claims, 10 Drawing Sheets

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2023-046325 filed Mar. 23, 2023.

BACKGROUND

(i) Technical Field

The present disclosure relates to information processing apparatuses, information processing methods, and non-transitory computer readable media.

(ii) Related Art

For example, Japanese Unexamined Patent Application Publication No. 2017-135561 discloses a configuration in which, when image data received by a facsimile receiver is to be transferred in accordance with a predetermined condition, a folder serving as a transfer destination is determined by referring to information about the image data, and a folder name of the folder is set as three hierarchical layers including a hierarchical layer of, for example, a date.

SUMMARY

When the acquired image data is transferred to a storage destination where the image data is stored, and is stored at a storage location corresponding to the acquisition date, it is conceivable that a person-in-charge performs work to complete a process on the stored image data within the current day. If the person-in-charge is to transfer image data acquired after a predetermined time, such as the business end time, to the storage location corresponding to the acquisition date, the image data does not undergo the process on the current day and remains unprocessed. Therefore, when the person-in-charge performs work on the following day and refers only to a storage location corresponding to the date of the following day, there is a possibility in which the image data not processed on the day of acquisition is overlooked and remains unprocessed.

Aspects of non-limiting embodiments of the present disclosure relate to reducing a situation where image data not processed on the day of acquisition is overlooked and remains unprocessed on or after the following day.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a processor configured to: acquire reception information as information indicating a reception date and a reception time of transmitted image data; transmit first information, serving as information including the reception date in the reception information, to a storage destination if the reception time in the acquired reception information has not passed a predetermined time, and transmit second information, serving as information including any date on or after a following day of the reception date, to the storage destination if the reception time has passed the predetermined time, the first information and the second information each serving as information indicating a storage location in the storage destination where the image data is stored when the image data is transferred to the storage destination; and transmit the first information instead of transmitting the second information when a predetermined time condition set based on communication status information is satisfied during transferring of the image data if the reception time has passed the predetermined time and the communication status information indicating a communication status during reception of the image data is acquired.

BRIEF DESCRIPTION OF THE DRAWINGS

Exemplary embodiments of the present disclosure will be described in detail based on the following figures, wherein.

DETAILED DESCRIPTION

An exemplary embodiment of the present disclosure will be described below with reference to the drawings.

Figure 1:
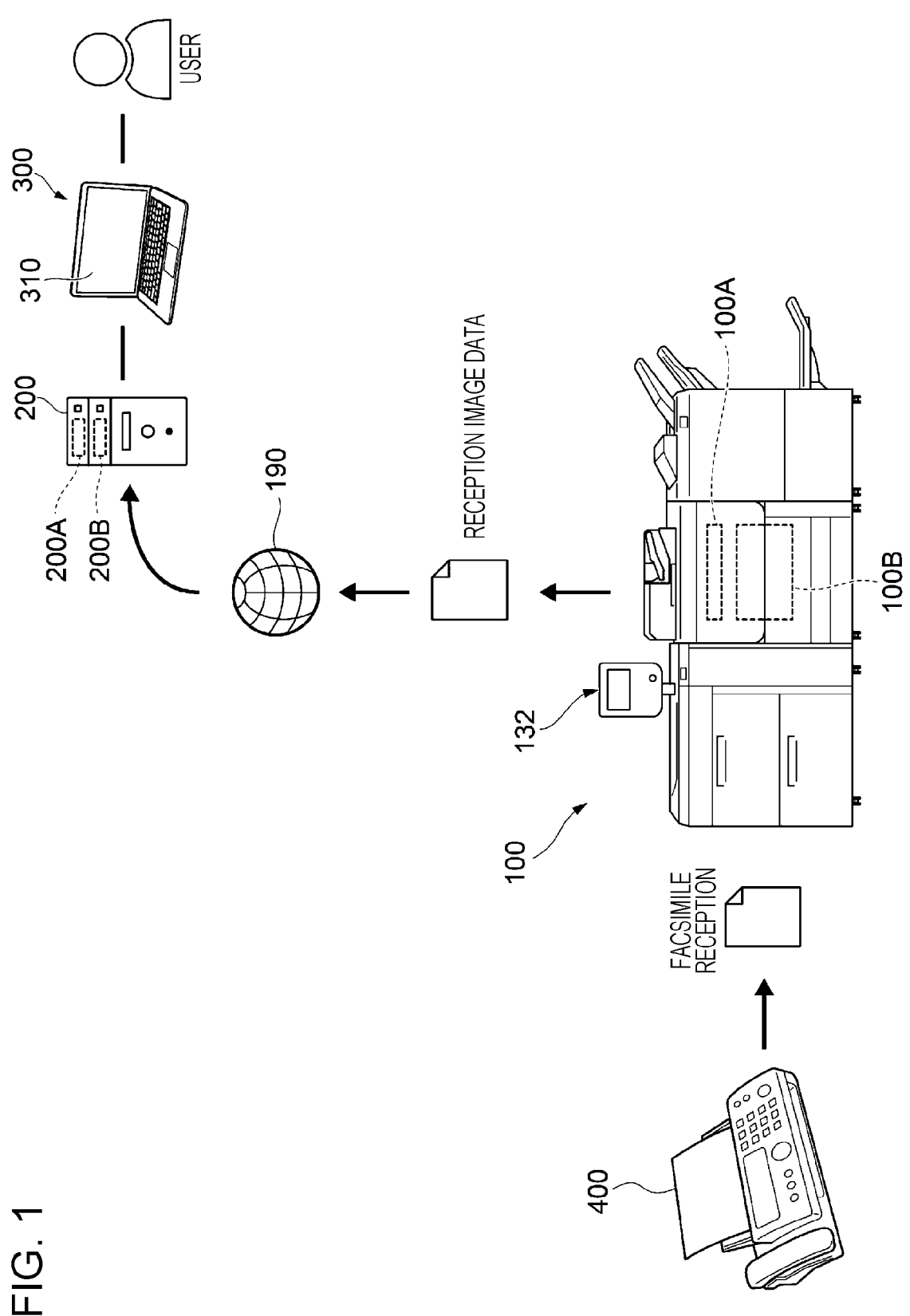
FIG. 1 illustrates an example of an image management system.

FIG. 1 illustrates an example of an image management system 1.

The image management system 1 according to this exemplary embodiment is provided with an image forming apparatus 100 having various functions, such as a copying function, a printing function, a facsimile function, and a scanning function, and a server apparatus 200 connected to the image forming apparatus 100 by a communication line 190. In this exemplary embodiment, the image forming apparatus 100 as an example of an information processing apparatus manages an image received by facsimile. The image is saved in a confidential box included in the image forming apparatus 100, or is transferred to the server apparatus 200 and is managed by being stored at a corresponding storage location. With regard to the image data, the transfer source is the image forming apparatus 100, and the transfer destination is the server apparatus 200.

Furthermore, the image management system 1 according to this exemplary embodiment is provided with a user terminal 300 that is connectable to the server apparatus 200 and that receives an operation from a user.

Although a single user terminal 300 is displayed in FIG. 1, multiple user terminals 300 may be provided.

The image forming apparatus 100 is provided with an information processing unit 100A. The information processing unit 100A executes various processes with respect to the image forming apparatus 100. For example, when the image forming apparatus 100 receives image data from a facsimile apparatus 400, the image forming apparatus 100 performs a predetermined process.

The image forming apparatus 100 is also provided with a storage device 100B that stores data. The storage device 100B stores data, such as reception image data received by facsimile or print data to be printed, and may be used as a box, such as a confidential box, created by software. The storage device 100B is realized with, for example, a hard disk drive (HDD). The reception image data is an example of image data.

The image forming apparatus 100 is provided with an image forming unit that forms an image on a sheet as an example of a recording medium by using, for example, the inkjet method or the electrophotography method.

The server apparatus 200 is provided with an information processing unit 200A that executes various processes. The information processing unit 200A executes various processes with respect to the server apparatus 200.

The server apparatus 200 is provided with a storage device 200B that stores data. The storage device 200B may include multiple folders for storing data transferred from the image forming apparatus 100. The folders are created based on a command from the user terminal 300 or a creation request from the information processing unit 200A, and are managed.

The storage device 200B is realized with, for example, an HDD.

The user terminal 300 is provided with a display device 310. The display device 310 is capable of displaying data stored in the storage device 200B of the server apparatus 200.

The user terminal 300 is realized with a computer. Examples of the user terminal 300 include a personal computer (PC), a smartphone, and a tablet terminal.

Figure 2:
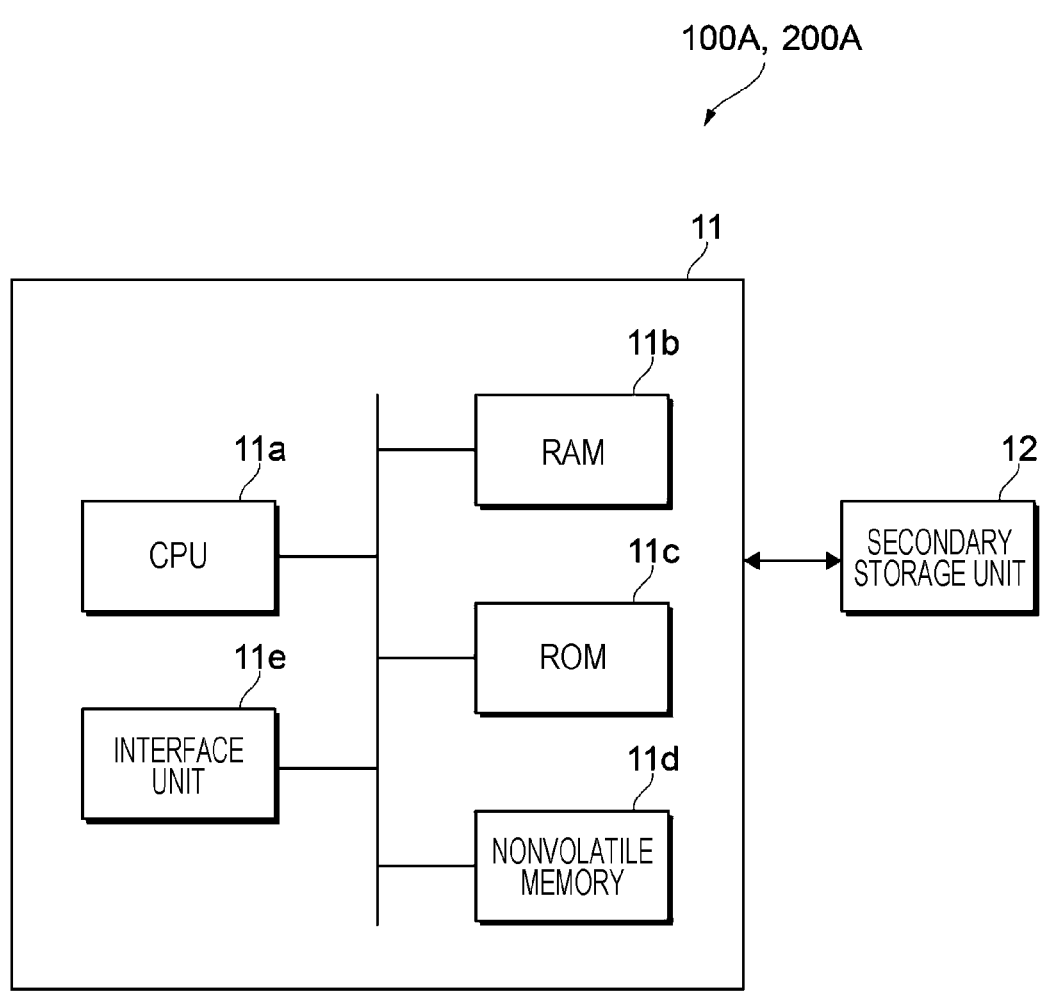
FIG. 2 illustrates a hardware configuration example of an information processing unit provided in an image forming apparatus and an information processing unit provided in a server apparatus.

FIG. 2 illustrates a hardware configuration example of the information processing unit 100A provided in the image forming apparatus 100 and the information processing unit 200A provided in the server apparatus 200. Each of the information processing units 100A and 200A is realized with a computer.

Each of the image forming apparatus 100 and the server apparatus 200 has an arithmetic processing unit 11 that executes a digital arithmetic process in accordance with a program, and a secondary storage unit 12 that stores information.

The secondary storage unit 12 is realized with an existing information storage device, such as an HDD, a semiconductor memory, or magnetic tape.

The arithmetic processing unit 11 is provided with a central processing unit (CPU) 11a as an example of a processor.

The arithmetic processing unit 11 is also provided with a random access memory (RAM) 11b used as a working memory for the CPU 11a and a read-only memory (ROM) 11c that stores a program to be executed by the CPU 11a.

The arithmetic processing unit 11 is further provided with a rewritable nonvolatile memory 11d capable of retaining data even when not supplied with electric power, and an interface unit 11e that controls each unit, such as a communication unit, connected to the arithmetic processing unit 11.

The nonvolatile memory 11d is constituted of, for example, a static random access memory (SRAM) or a flash memory backed up by a battery. In addition to a file, the secondary storage unit 12 stores a program to be executed by the arithmetic processing unit 11.

In this exemplary embodiment, the arithmetic processing unit 11 reads the programs stored in the ROM 11c and the secondary storage unit 12 so as to execute various processes.

The program to be executed by the CPU 11a may be provided to the information processing units 100A and 200A by being stored in a computer-readable storage medium, such as a magnetic storage medium (e.g., magnetic tape or a magnetic disk), an optical storage medium (e.g., an optical disk), a magneto-optical storage medium, or a semiconductor memory. Alternatively, the program to be executed by the CPU 11a may be provided to the information processing units 100A and 200A by using a communication unit, such as the Internet.

In this description, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

Furthermore, the term "processor" is broad enough to encompass one processor or plural processors in collaboration which are located physically apart from each other but may work cooperatively. The order of operations of the processor is not limited to one described in this exemplary embodiment, and may be changed.

Of processes to be described below, a process to be performed by the image forming apparatus 100 is performed by the CPU 11a as an example of a processor provided in the image forming apparatus 100.

Furthermore, of the processes to be described below, a process to be performed by the server apparatus 200 is performed by the CPU 11a as an example of a processor provided in the server apparatus 200.

An information processing system constituted of the image forming apparatus 100 may be realized with a single apparatus, such as a single image forming apparatus 100, or may be realized with multiple apparatuses.

Figure 3:
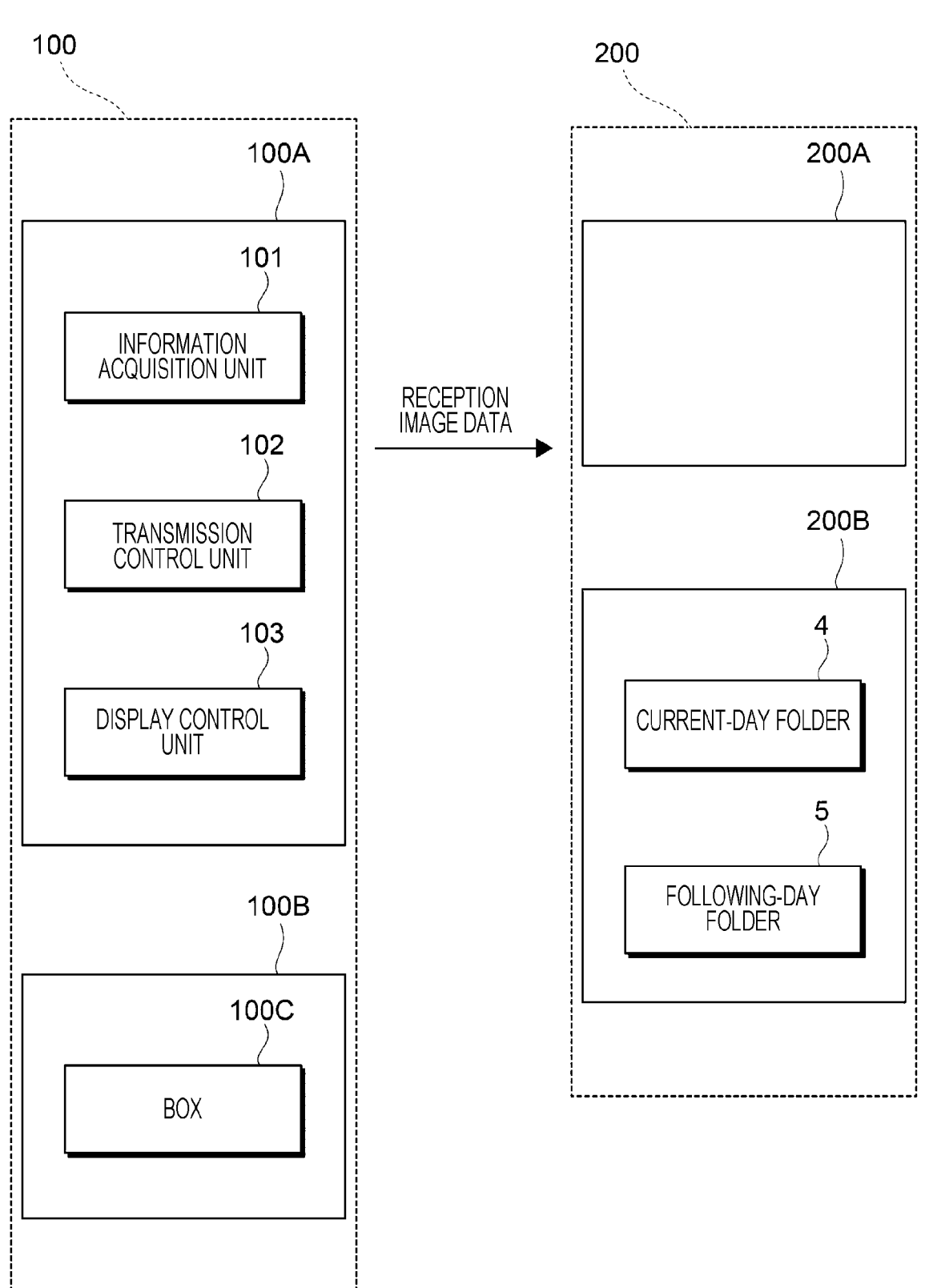
FIG. 3 is a block diagram illustrating a functional configuration of the image forming apparatus and the server apparatus.

FIG. 3 is a block diagram illustrating a functional configuration of the image forming apparatus 100 and the server apparatus 200.

As shown in FIG. 3, the information processing unit 100A of the image forming apparatus 100 has an information acquisition unit 101, a transmission control unit 102, and a display control unit 103.

The information acquisition unit 101 acquires various types of information, such as the reception image data and information about the reception time. The information acquisition unit 101 performs various processes related to the reception image data by using the acquired information. Moreover, the information acquisition unit 101 acquires a congestion status of the communication line and acquires a margin time according to the congestion status.

The information acquisition unit 101 acquires information from the server apparatus 200 and the user terminal 300.

The transmission control unit 102 performs control for transmitting the various types of information acquired by the information acquisition unit 101 and results of the aforementioned processes to the server apparatus 200.

The display control unit 103 performs display control of the display device 310 of the user terminal 300 with respect to the server apparatus 200. The content of the display control is transmitted to the server apparatus 200 by the transmission control unit 102.

As shown in FIG. 3, the storage device 100B of the image forming apparatus 100 includes a box 100C including the aforementioned confidential box. For example, the reception image data is stored in the box 100C.

The storage device 200B of the server apparatus 200 has multiple folders. The multiple folders are created by the information processing unit 200A in response to a request from the image forming apparatus 100. For example, the multiple folders may include a folder for every date and a folder for every person-in-charge as a user of the user terminal 300.

The storage device 200B has the multiple folders created by the information processing unit 200A. The multiple folders may include a person-in-charge folder as a folder created for every person-in-charge and a date folder as a folder created for every date.

For example, the reception image data (see FIG. 1) is stored in a person-in-charge folder of a person-in-charge assigned in accordance with a predetermined condition. In this case, a date folder may be created in the person-in-charge folder and be used as a date folder for every reception date as the date of facsimile reception. The reception date may conceivably be included as a folder name of the date folder.

As shown in FIG. 3, in this exemplary embodiment, the storage device 200B has a current-day folder 4 and a following-day folder 5 as the multiple folders.

Of the date folders mentioned above, the current-day folder 4 is a date folder of the current day and includes the reception date of the current day with reference to a certain day in a folder name. The following-day folder 5 is a date folder of the following day and includes the reception date of the following day in a folder name.

A folder that includes the reception date of a previous day with reference to a certain day in a folder name may be referred to as a date folder of the previous day.

The following relates to a conceivable case where a current-day reception deadline for facsimile reception is set. Such a deadline may be set by a company for allowing a person-in-charge to complete a predetermined process within the business hours of the current day of reception if an order is received by facsimile, or may be set by, for example, a supervisor for setting a time limit for submitting a test report by facsimile.

In a system that sorts the reception image data depending on current-day reception or following-day reception with reference to the deadline, the reception image data set as current-day reception is stored in the current-day folder 4

(see FIG. 3) of the server apparatus 200, and the reception image data set as following-day reception is stored in the following-day folder 5 (see FIG. 3), thereby ensuring smooth processing of the reception image data by the person-in-charge.

Even when a facsimile has been transmitted from the facsimile apparatus 400 (see FIG. 1) prior to a time point set as the deadline in this system, a situation where the facsimile is received by the image forming apparatus 100 after the deadline may conceivably occur depending on non-transmission or retransmission due to the image forming apparatus 100 receiving a facsimile from, for example, another facsimile apparatus or depending on the line congestion status caused by, for example, a temporary communication failure in the line.

Since the transmission time point is prior to the deadline, if the facsimile sender recognizes that the facsimile has been received on the current day, a discrepancy unfavorably occurs between a reception-date-based sort result in the image forming apparatus 100 and the recognition of the facsimile sender. Furthermore, since such a situation is not caused due to the condition at the facsimile sender's side, employing control for performing sorting uniformly may possibly lead to an increase in drawback for the facsimile sender.

This exemplary embodiment employs control for setting not only following-day reception but also current-day reception in accordance with the line congestion status even when facsimile reception occurs after the deadline, thereby reducing a drawback received by the facsimile sender.

The server apparatus 200 is an example of a storage destination, the current-day folder 4 and the following-day folder 5 in the storage device 200B of the server apparatus 200 are examples of storage locations, and the folder names thereof are examples of information indicating the storage locations.

The following description relates to a first exemplary embodiment, a second exemplary embodiment, and a third exemplary embodiment. First, the first exemplary embodiment will be described. With regard to the second exemplary embodiment and the third exemplary embodiment, descriptions common to the first exemplary embodiment may sometimes be omitted.

First Exemplary Embodiment

Figure 4:
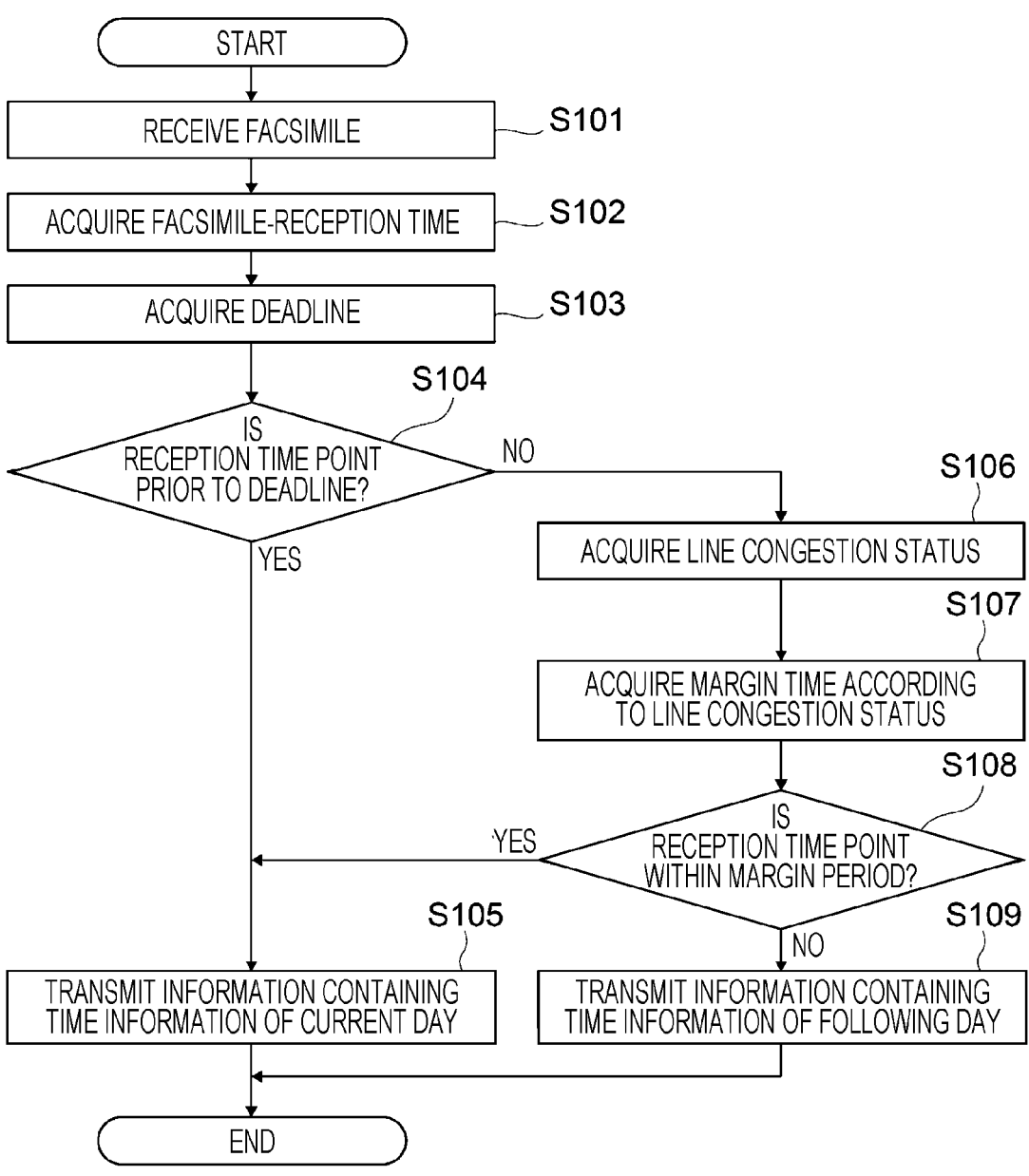
FIG. 4 is a flowchart illustrating a processing example in a central processing unit (CPU) of the information processing unit in the image forming apparatus according to a first exemplary embodiment.

FIG. 4 is a flowchart illustrating a processing example in the CPU 11a (see FIG. 2) of the information processing unit 100A in the image forming apparatus 100 according to the first exemplary embodiment.

In the processing example shown in FIG. 4, if the image forming apparatus 100 receives a facsimile from the facsimile apparatus 400 (see FIG. 1) in step S101, the information acquisition unit 101 (see FIG. 3) of the CPU 11a stores acquired reception image data in the storage device 100B. Then, the information acquisition unit 101 acquires time information of the current day, that is, facsimile-reception time information, serving as information indicating the date and time of the facsimile reception in step S102, and acquires deadline information in step S103.

The facsimile-reception time information in this case is an example of reception information serving as information indicating a reception date and a reception time of transmitted image data.

The deadline information in this case is information input to the image forming apparatus 100 and used for sorting the reception image data in the current-day folder 4 or the following-day folder 5 as a storage location, and is prelimi-narily stored in the RAM 11*b* (see FIG. 2) of the information processing unit 100A.

The deadline information may be input to an operation reception unit 132 (see FIG. 1) of the image forming apparatus 100 or may be input to the image forming appa-ratus 100 via the communication line 190. The deadline is an example of a predetermined time.

In step S104, the information acquisition unit 101 uses the acquired facsimile-reception time information and the acquired deadline information to determine whether a recep-tion time point based on the facsimile-reception time is prior to the deadline.

If the reception time point is prior to the deadline (Yes in step S104), the transmission control unit 102 (see FIG. 3) transmits information containing time information of the current day to the server apparatus 200 in step S105 to set the storage location for the reception image data to be transferred to the current-day folder 4 (see FIG. 3).

The information containing the time information of the current day is an example of first information serving as information including a reception date of reception infor-mation.

If the reception time point is after the deadline (No in step S104), the information acquisition unit 101 acquires a con-gestion status of the communication line in step S106 and acquires information indicating a margin time according to the congestion status in step S107.

The information indicating the margin time according to the congestion status is an example of a predetermined time condition set based on communication status information.

The congestion status of the communication line may be acquired as information indicating a congestion level by, for example, checking the number of facsimiles received near the deadline. In the case of Internet facsimile, the congestion status of the communication line may be acquired based on the Internet line speed using a command, such as ping.

The congestion status of the communication line is an example of communication status information indicating a communication status during reception of image data, and is an example of communication congestion information indi-cating a congestion status of communication during recep-tion of image data.

The margin time is information used for determining which of reception image data received by facsimile after the deadline is to be set as current-day reception, and is set to a period subsequent to the deadline. Specifically, a period from when the deadline has passed to when the margin time has passed may be referred to as a margin period. Reception image data received by facsimile within the margin period is treated as current-day reception even if the deadline has passed.

The margin time may be set dynamically in accordance with the congestion status of the communication line. For example, the margin time is calculated from the time of line congestion. As one example, the margin time is set to 0 minutes if the line is not congested, the margin time is set to 5 minutes if the line is congested, and the margin time is set to 15 minutes if the line is very congested. Accordingly, if the information indicating the congestion level indicates a high congestion level, the margin time is set to be longer than when the information indicating the congestion level indicates a low congestion level.

For example, in the case of a telephone line, the facsimile apparatus 400 sometimes has a function for performing redialing or retransmission for a predetermined number of times when the facsimile apparatus 400 (see FIG. 1) is not connectable to the image forming apparatus 100 during facsimile transmission. When a facsimile is received after the deadline, if the time point at which the transmission of the received facsimile is successful as a result of retrans-mission is within the margin period in this exemplary embodiment, the received facsimile is treated as current-day reception, regardless of the fact that the reception is after the deadline on the current day, as will be described later. Accordingly, the margin time is set in accordance with the condition at the receiver's side.

In step S108, the information acquisition unit 101 uses the acquired information about the margin time to determine whether the reception time point based on the facsimile-reception time is within the margin period obtained by adding the margin time to the deadline.

If the reception time point is within the margin period (Yes in step S108), the process proceeds to step S105 described above. Specifically, the transmission control unit 102 (see FIG. 3) transmits the information containing the time information of the current day to the server apparatus 200.

If the reception time point is not within the margin period (No in step S108), the transmission control unit 102 trans-mits information containing time information of the follow-ing day to the server apparatus 200 in step S109 to set the storage location for the reception image data to be trans-ferred to the following-day folder 5 (see FIG. 3). Specifi-cally, even when a facsimile has been transmitted prior to the deadline, if the facsimile is not received within the margin period, the facsimile reception is treated as following-day reception.

The information transmitted in step S105 and step S109 described above may include the content of display control by the display control unit 103 (see FIG. 3).

The information containing the time information of the following day is an example of second information serving as information including any date on or after the following day of the reception date.

Figure 5A:
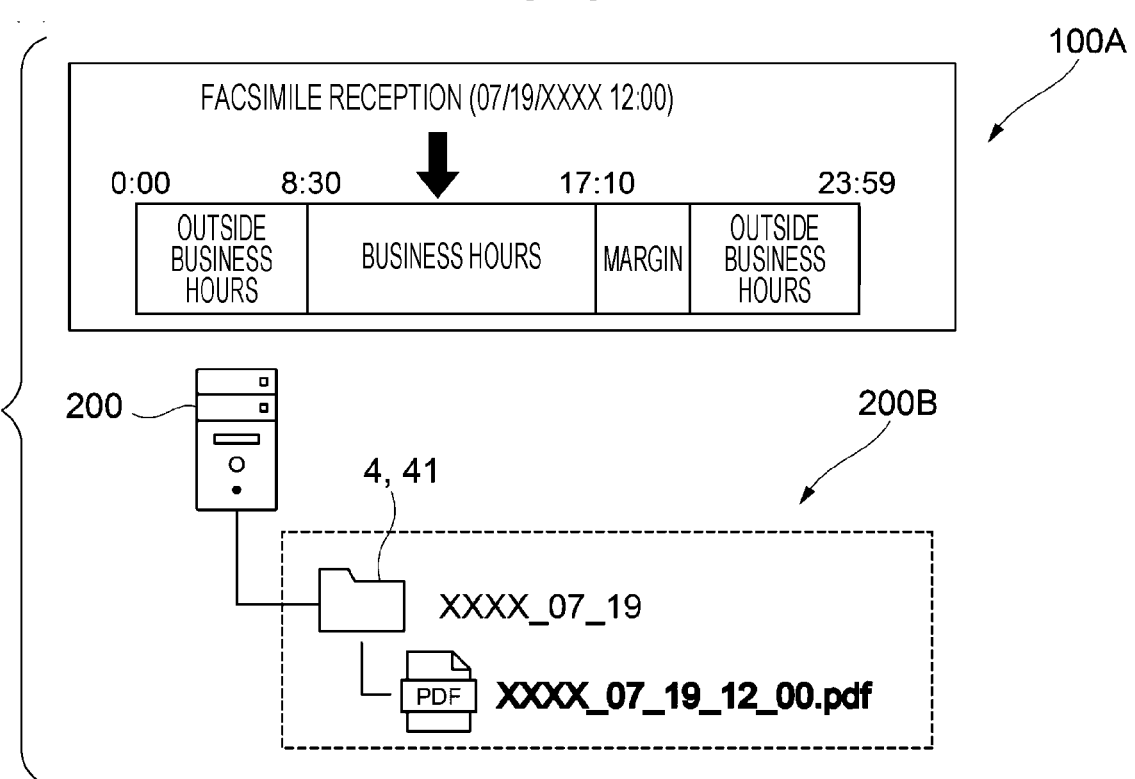
FIGS. 5A and 5B illustrate specific examples according to the first exemplary embodiment, FIG. 5A illustrating a first specific example where facsimile reception occurs within business hours, FIG. 5B illustrating a second specific example where facsimile reception occurs within a margin period.
Figure 5B:
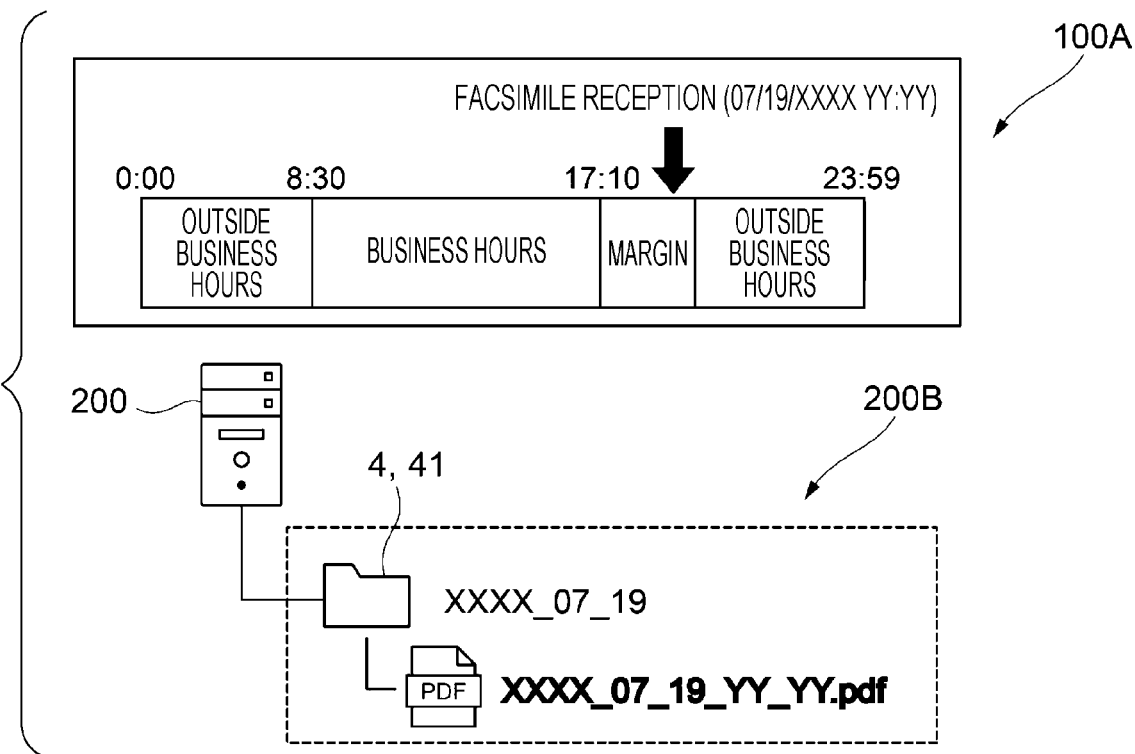
Figure 6:
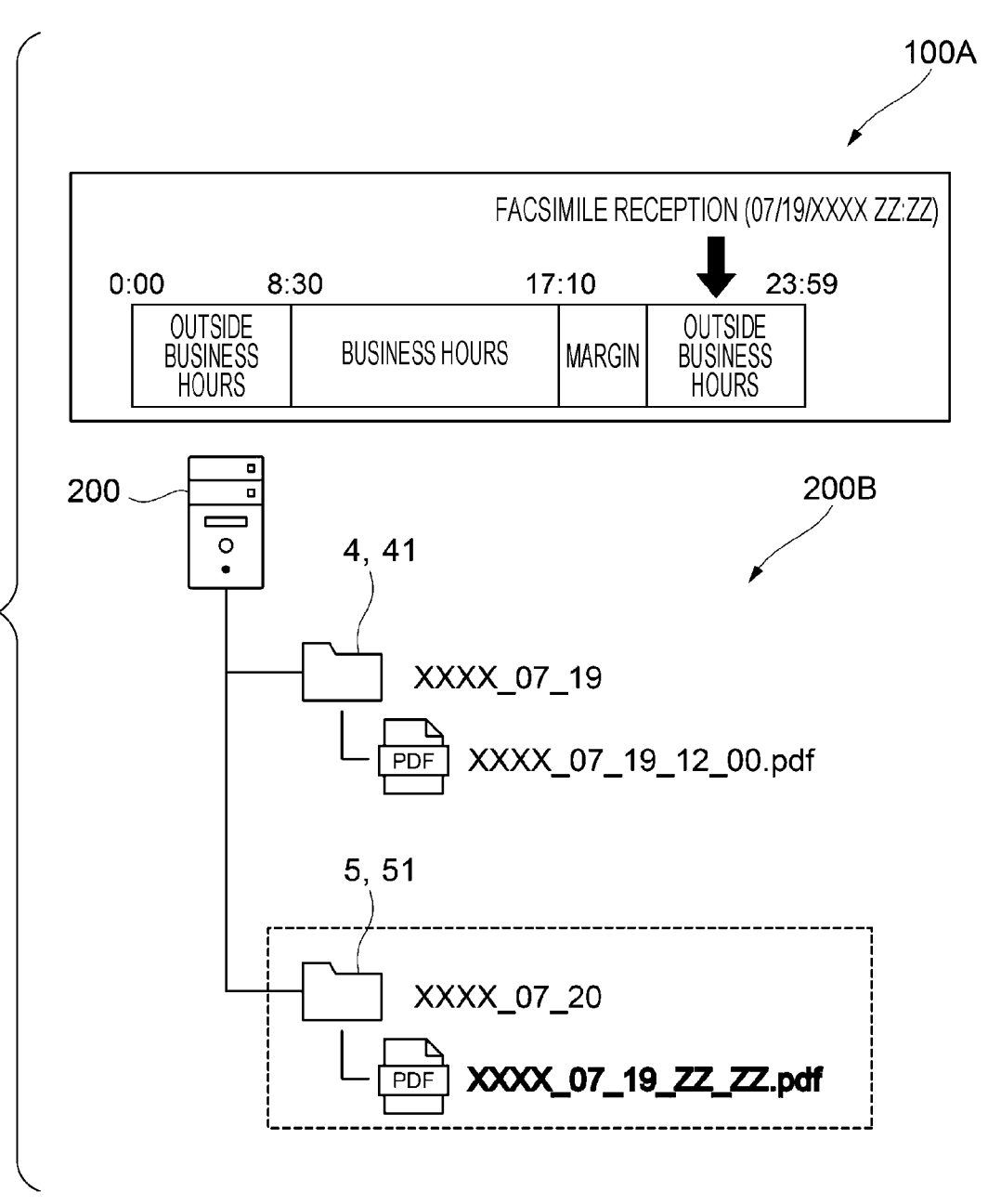
FIG. 6 illustrates another specific example according to the first exemplary embodiment and shows a third specific example where facsimile reception occurs after the margin period.

FIGS. 5A to 6 illustrate specific examples according to the first exemplary embodiment. FIG. 5A illustrates a first specific example where facsimile reception occurs within business hours, FIG. 5B illustrates a second specific example where facsimile reception occurs within the margin period, and FIG. 6 illustrates a third specific example where facsimile reception occurs after the margin period. The business hours are from 8:30 to 17:10 in 24-hour notation, the deadline is set to 17:10, which is the same as the business end time point, and a predetermined time thereafter is set as the margin time.

In other words, in the first exemplary embodiment, the business end time point and the deadline are set to, but not limited to, the same time point. Alternatively, the deadline may be set to, for example, 17:00 that is prior to the business end time point of 17:10.

Although FIGS. 5A to 6 are diagrams for explaining the image forming apparatus 100 and the server apparatus 200, a part indicating the file configuration within the storage device 200B of the server apparatus 200 may be regarded that the part indicates a mode of a screen displayed on the display device 310 (see FIG. 1) of the user terminal 300 from a different perspective. The same applies to FIG. 6 and FIGS. 8A to 8C to be described later.

In the case of the first specific example shown in FIG. 5A, the facsimile-reception time in the image forming apparatus 100 indicates 12:00 on July 19, XXXX, meaning that the reception time point is prior to the deadline. Therefore, the transmission control unit 102 (see FIG. 3) transmits information containing time information of the current day to the server apparatus 200 (see step S105 in FIG. 4). The information containing the time information transmitted to the server apparatus 200 is, for example, file-path information including a date folder name and a filename indicating a reception time point of reception image data. As an example of this "time information, file-path information/ XXXX_07_19_/XXXX_07_19_12_00.pdf" is transmitted.

As mentioned above, the time information of the current day contains information indicating the date of the current day of facsimile reception and information indicating the time point thereof. As mentioned above, the information containing the time information of the current day includes the content of display control by the display control unit 103.

When the server apparatus 200 receives the information containing the time information of the current day, the information processing unit 200A checks whether the storage device 200B has a first folder 41 serving as the current-day folder 4. A folder name of the first folder 41 is based on information indicating the date of the current day and is "XXXX_07_19".

If there is no first folder 41, the information processing unit 200A newly creates the first folder 41 as the current-day folder 4 in the storage device 200B. As an alternative to this exemplary embodiment in which a folder existing in the server apparatus 200 is checked on an as-needed basis at the transmission timing of reception image data, a folder existing in the server apparatus 200 may be checked in advance every time a predetermined time elapses.

Furthermore, the information processing unit 200A stores reception image data currently received from the image forming apparatus 100 into the first folder 41 in the storage device 200B by using a filename of a predetermined file format. Specifically, newly acquired reception image data undergoes a file format conversion and a filename change and is stored with a filename "XXXX_07_19_12_00.pdf" in the folder "XXXX_07_19".

The filename stored in the first folder 41 shown in FIG. 5A is indicated with a bold font. The mode of screen display using this bold font indicates that the file is unprocessed or that the process has not started.

In other words, the rectangle indicated with the dashed line is given for illustrative purposes but may serve as the mode of screen display on the display device 310 of the user terminal 300. The same applies to FIGS. 6 to 8C to be described later.

In the case of the second specific example shown in FIG. 5B, the facsimile-reception time in the image forming apparatus 100 indicates YY:YY on July 19, XXXX, meaning that the reception time point is after the deadline but is within the margin period (see Yes in step S108 in FIG. 4). Therefore, the transmission control unit 102 (see FIG. 3) transmits information containing time information of the current day to the server apparatus 200 (see step S105 in FIG. 4).

When the server apparatus 200 receives the information containing the time information of the current day, if the storage device 200B has the first folder 41 with the folder name "XXXX_07_19", the information processing unit 200A stores transferred reception image data with a filename "XXXX_07_19_YY_YY.pdf" in the first folder 41. This filename is indicated with a bold font, similar to the case in FIG. 5A.

If there is no first folder 41, the first folder 41 is newly created, and the reception image data with the filename "XXXX_07_19_YY_YY.pdf" is stored therein.

In the case of the third specific example shown in FIG. 6, the facsimile-reception time indicates ZZ:ZZ on July 19, XXXX, meaning that the reception time point is after the deadline and is not within the margin period (see No in step S108 in FIG. 4). Therefore, the transmission control unit 102 (see FIG. 3) transmits information containing time information of the following day to the server apparatus 200 (see step S109 in FIG. 4).

The information processing unit 200A stores transferred reception image data with a filename "XXXX_07_19_ZZ_ZZ.pdf" in a second folder 51 with a folder name "XXXX_07_20". The second folder 51 is one example of the following-day folder 5.

In the case shown in FIG. 6, since a file stored in the first folder 41 has already been processed, the filename thereof is not displayed with a bold font. On the other hand, a filename stored in the second folder 51 is unprocessed and is thus indicated with a bold font.

Second Exemplary Embodiment

Figure 7:
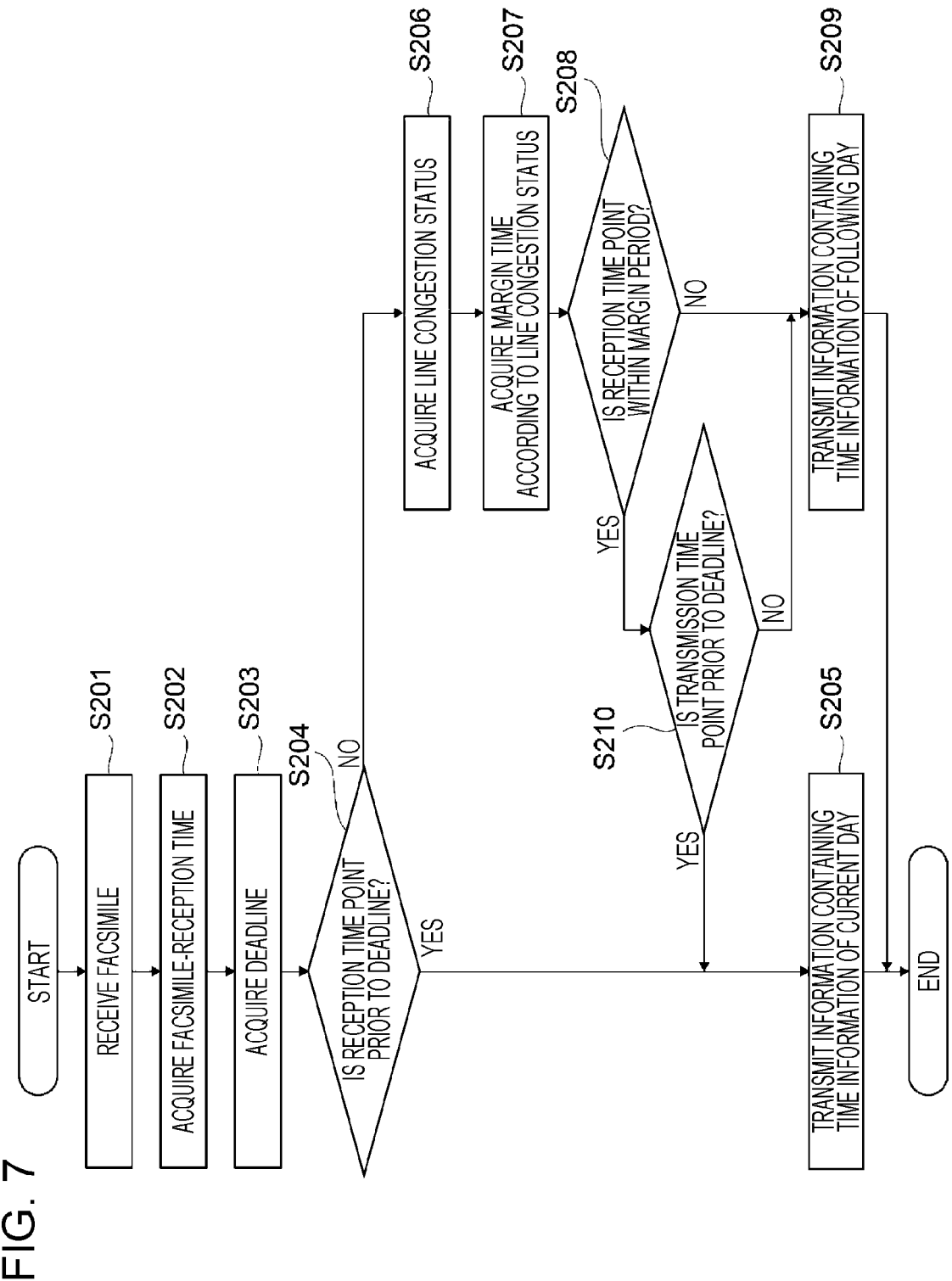
FIG. 7 is a flowchart illustrating a processing example in the CPU of the information processing unit of the image forming apparatus according to a second exemplary embodiment.

FIG. 7 is a flowchart illustrating a processing example in the CPU 11*a* (see FIG. 2) of the information processing unit 100A in the image forming apparatus 100 according to the second exemplary embodiment. FIG. 7 corresponds to FIG. 4 used above for describing the first exemplary embodiment. Since step S201 to step S209 in FIG. 7 correspond to step S101 to step S109 in FIG. 4, descriptions thereof may sometimes be omitted.

In the processing example shown in FIG. 7, if the reception time point at which the facsimile is received is within the margin period (Yes in step S208), it is subsequently determined in step S210 whether the transmission time point of the received facsimile is prior to the deadline. Specifically, in the second exemplary embodiment, if a facsimile is received after the deadline, it is determined whether the received facsimile is to be treated as current-day reception while including not only the facsimile reception time but also the facsimile transmission time.

With regard to this transmission time, for example, if the reception image data includes a printed transmission time point, the determination may be performed by using the transmission time point. If transmission information from the facsimile apparatus 400 contains information about the transmission time point, the determination may be performed by using the information.

More specifically, even though the information about the transmission time point has lower reliability than information indicating the reception date and the reception time of transmitted image data, if the information about the transmission time point is acquired, it is determined in step S210 whether the image data received via facsimile is treatable as current-day reception.

The information about the transmission time point is an example of a transmission time of image data.

If the transmission time point is prior to the deadline (Yes in step S210), the process proceeds to step S205 where the reception image data is treated as current-day reception. On the other hand, if the transmission time point is after the deadline (No in step S210), the process proceeds to step S209 where the reception image data is treated as following-day reception.

Information indicating whether the transmission time point is prior to the deadline is an example of a condition related to a transmission time of image data. The condition related to the transmission time of the image data indicates that the transmission time is before the deadline. In addition, the condition for the transmission time may be relaxed by providing the transmission time with a margin time, or the condition for the transmission time may be tightened by providing the transmission time with a reverse margin time.

Figures 8A, 8B, 8C:
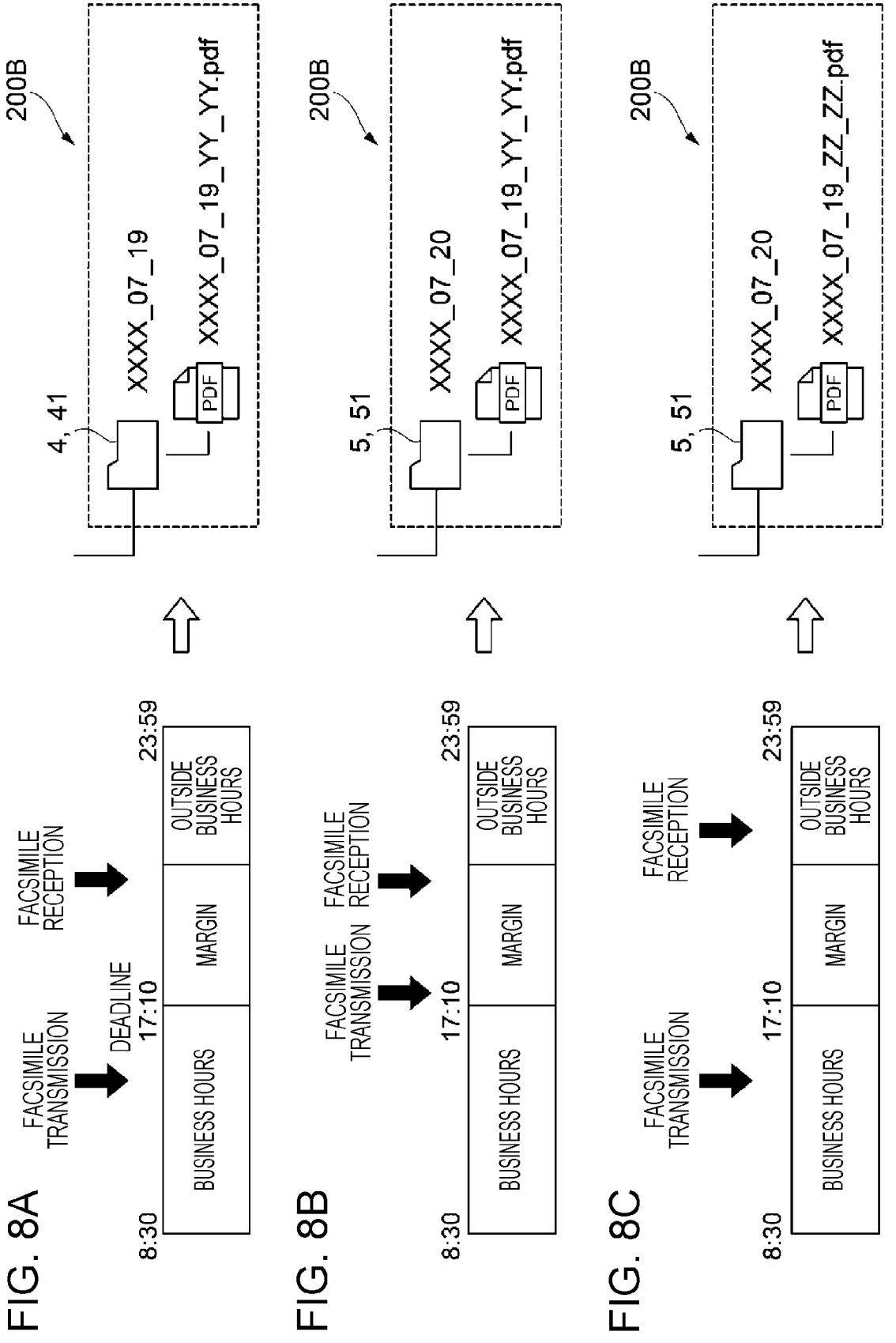
FIGS. 8A to 8C illustrate specific examples according to the second exemplary embodiment, FIG. 8A illustrating a first specific example, FIG. 8B illustrating a second specific example, FIG. 8C illustrating a third specific example.

FIGS. 8A to 8C illustrate specific examples according to the second exemplary embodiment. Specifically, FIG. 8A illustrates a first specific example, FIG. 8B illustrates a second specific example, and FIG. 8C illustrates a third specific example.

In the case of the first specific example shown in FIG. 8A, the facsimile-reception time point is within the margin period, and the facsimile-transmission time point is prior to the deadline of 17:10 (see Yes in step S208 and Yes in step S210 in FIG. 7). Therefore, the reception image data is stored in the first folder 41 serving as the current-day folder 4 having the filename "XXXX_07_19_YY_YY.pdf" (see step S205 in FIG. 7).

In the case of the second specific example shown in FIG. 8B, the facsimile-reception time point is within the margin period, but the facsimile-transmission time point is after the deadline of 17:10 (see Yes in step S208 and No in step S210 in FIG. 7). Therefore, the reception image data has been transmitted by facsimile after the deadline and is thus stored in the second folder 51 serving as the following-day folder 5 (see step S209 in FIG. 7).

In the case of the third specific example shown in FIG. 8C, the facsimile-reception time point is after the margin period (No in step S208 in FIG. 7). Therefore, the reception image data is stored in the second folder 51 serving as the following-day folder 5 (see step S209 in FIG. 7).

Although the facsimile transmission is prior to the deadline, the facsimile reception is beyond the margin period. Therefore, instead of being a problem in the line at the receiver's side, it is determined that there is a problem in the line at the sender's side or that the time display at the sender's side is wrong, and the facsimile reception is treated as following-day reception.

Third Exemplary Embodiment

The third exemplary embodiment relates to, for example, management of reception image data in a case where test reports of all students in a class at a school have been transmitted by facsimile to the image forming apparatus 100. This facsimile reception is performed by each student. A due date for submitting the test report is set as the deadline, and the number of documents expected to be received by facsimile is set in advance.

The third exemplary embodiment relates to a case where the number of documents expected to be received is ascertainable in advance. In this regard, the method of how the margin time is set is different from the first exemplary embodiment and the second exemplary embodiment.

The third exemplary embodiment will be described below with reference to FIGS. 9 and 10.

Figure 9:
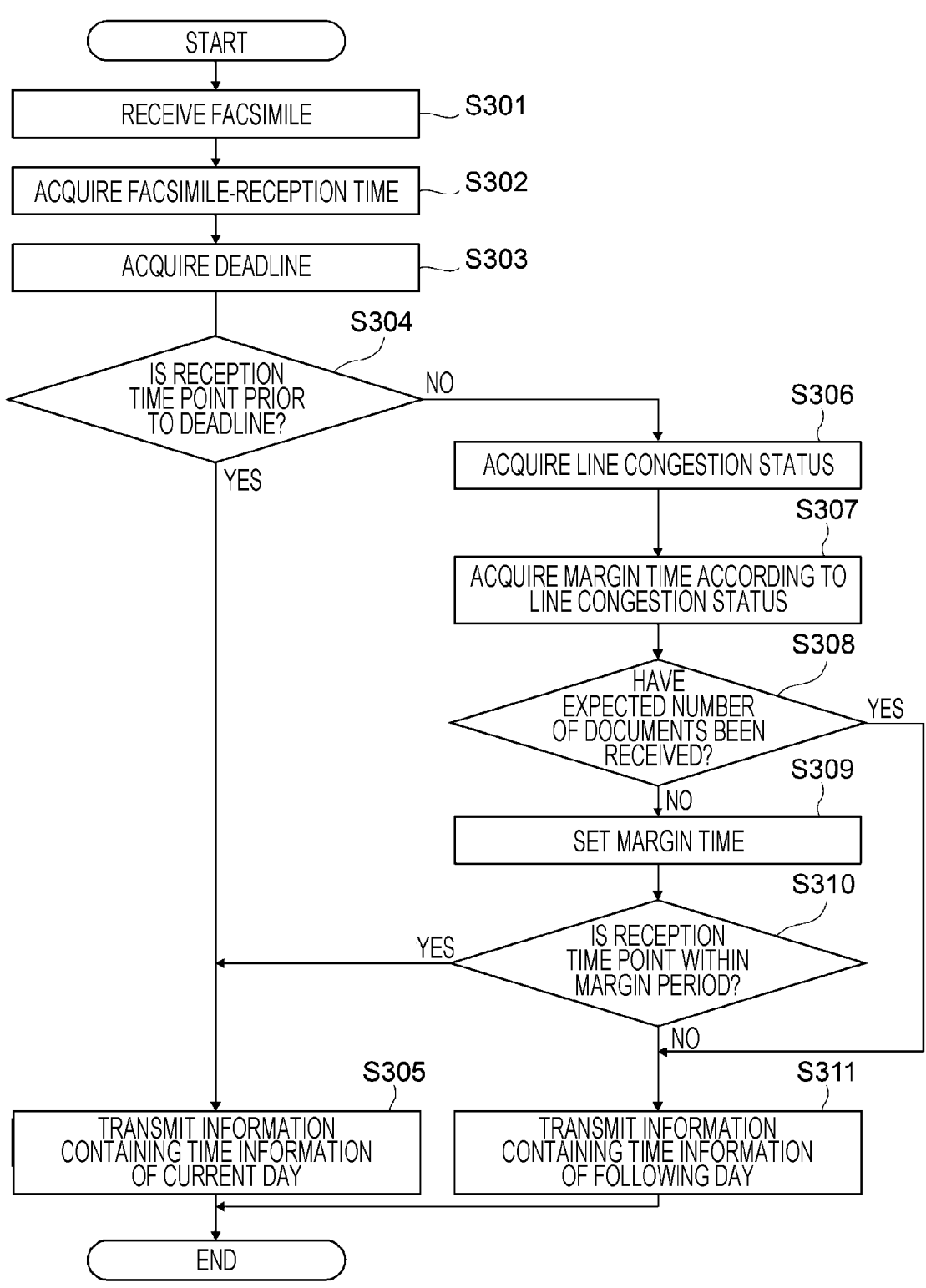
FIG. 9 is a flowchart illustrating a processing example in the CPU of the information processing unit of the image forming apparatus according to a third exemplary embodiment.

FIG. 9 is a flowchart illustrating a processing example in the CPU 11a (see FIG. 2) of the information processing unit 100A in the image forming apparatus 100 according to the third exemplary embodiment. FIG. 9 corresponds to FIG. 7 used above for describing the second exemplary embodiment. Since step 301 to step 307, step 310, and step 311 in FIG. 9 correspond to step 101 to step 109 in FIG. 4, descriptions thereof may sometimes be omitted.

In the processing example shown in FIG. 9, if the reception time point is after the deadline (No in step S304) and the margin time according to the line congestion status is acquired in steps S306 and S307, it is first determined in step S308 whether the expected number of documents have been received. If the expected number of documents have been received (Yes in step S308), the process proceeds to step S311. Specifically, the currently-received reception image data is not treated as current-day reception and is treated as following-day reception.

The expected number in this case is an example of communication status information, and is an example of expected-number-of-receptions information indicating the expected number as the number of items of image data expected to be received.

If the expected number of documents have not been received after the deadline (No in step S308), it is ascertainable that a test report of any of the students has not been received by facsimile yet. For example, even if this student has attempted transmission by facsimile, the facsimile reception may have been unsuccessful due to the condition at the receiver's side or the condition at the sender's side. Thus, the image forming apparatus 100 sets a margin time in step S309 and determines in step S310 whether the reception time point is within the margin period. If the reception time point is within the margin period (Yes in step S310), the process proceeds to step S305 to give aid to the student. If the reception time point is not within the margin time (No in step S310), the process proceeds to step S311.

As will be described later, the margin time is set based on the expected number of receptions and is an example of a predetermined time condition.

In the third exemplary embodiment, if the expected number of documents have been received after the deadline, the margin time is not set (Yes in step S308 in FIG. 9) regardless of whether the communication is congested.

If the margin time is set (see step S309 in FIG. 9), a shorter time is settable as the margin time, as compared with the first and second exemplary embodiments that are targeted to facsimile reception from unspecified persons. In the case of the third exemplary embodiment, the shorter margin time is readily achievable since there is a smaller variation in the volume of data to be received by facsimile, as compared with the first and second exemplary embodiments.

More specifically, the time it takes for facsimile reception is ascertainable in accordance with the number of documents. If the number of test reports is ascertainable in advance, a predetermined reception time may be calculated as the time it takes for receiving a document for each student. Moreover, since the expected number of receptions is ascertained, the number of non-receptions is ascertainable as the number of students from which facsimiles have not received. The margin time may be set in accordance with the congestion status, and may be set to, for example, 1.5 times a value obtained by multiplying the predetermined reception time by the number of non-receptions.

Figure 10:
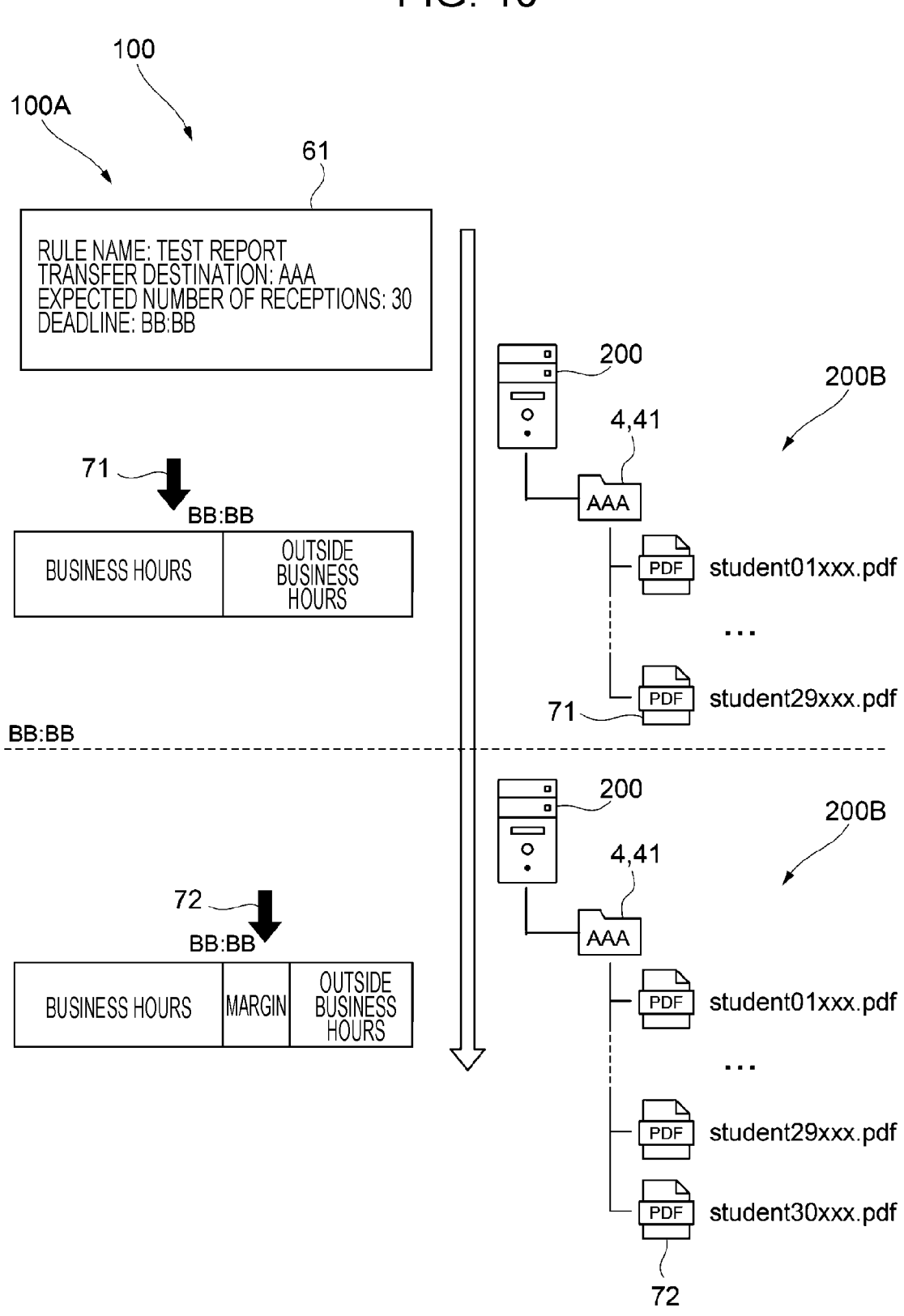
FIG. 10 illustrates a specific example according to the third exemplary embodiment.

FIG. 10 illustrates a specific example according to the third exemplary embodiment. FIG. 10 is shown in a time-series fashion from top to bottom, as indicated with an arrow. The left side of the arrow is a region indicating the image forming apparatus 100, and the right side is a region indicating the server apparatus 200.

In the case of the specific example shown in FIG. 10, the information processing unit 100A of the image forming apparatus 100 retains information 61 for image management. The information 61 includes test report as a rule name, AAA as a transfer-destination folder to the server apparatus 200, 30 as the expected number of receptions by facsimile, and BB:BB as a deadline.

The information processing unit 100A of the image forming apparatus 100 manages information about documents received by facsimile, and holds information indicating the number of documents and the filenames thereof.

In FIG. 10, the position of a dotted line extending in the left-right direction that intersects the arrow corresponds to the deadline BB:BB. The side above the position is prior to the deadline and is within business hours, whereas the side below the position is after the deadline and is outside the business hours.

New reception image data "student29xxx.pdf" is received by facsimile at a time point 71 within the business hours so as to be stored in the first folder 41 serving as the current-day folder 4 in the storage device 200B. Accordingly, reception image data "student01xxx.pdf" to reception image data "student29xxx.pdf" are stored in the first folder 41. Because the expected number is 30, the expected number is not reached yet since the image forming apparatus 100 has received only 29 documents by facsimile.

Subsequently, if facsimile reception occurs at a time point 72 after the deadline BB:BB (see No in step S304 in FIG. 9), a margin time is set assuming that the expected number of documents have not been received yet (see No in step S308 in FIG. 9 and step S309). Since the time point 72 serving as a reception time point is within the margin period, "student30xxx.pdf" is stored in the first folder 41.

When the received documents reach the expected number of 30 (see step S308 in step 9), the margin time is no longer set, and no more documents are stored in the current-day folder 4. Accordingly, the margin period is provided only when the number of received documents is below the number of documents expected to be received.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) An information processing apparatus comprising:
a processor configured to:
acquire reception information as information indicating a reception date and a reception time of transmitted image data;
transmit first information, serving as information including the reception date in the reception information, to a storage destination if the reception time in the acquired reception information has not passed a predetermined time, and transmit second information, serving as information including any date on or after a following day of the reception date, to the storage destination if the reception time has passed the predetermined time, the first information and the second information each serving as information indicating a storage location in the storage destination where the image data is stored when the image data is transferred to the storage destination; and
transmit the first information instead of transmitting the second information when a predetermined time condition set based on communication status information is satisfied during transferring of the image data if the reception time has passed the predetermined time and the communication status information indicating a communication status during reception of the image data is acquired.

(((2))) The information processing apparatus according to (((1))),
wherein the communication status information is communication congestion information indicating a congestion status of communication during the reception of the image data.

(((3))) The information processing apparatus according to (((2))),
wherein the communication congestion information includes information indicating a congestion level, and
wherein, if the information indicating the congestion level indicates a high congestion level, the predetermined time condition is relaxed, as compared with when the information indicating the congestion level indicates a low congestion level.

(((4))) The information processing apparatus according to (((1))),
wherein the communication status information is expected-number-of-receptions information indicating an expected number as a number of items of the image data expected to be received.

(((5))) The information processing apparatus according to (((4))),
wherein, if a number of items of image data identified from the acquired reception information is below the expected number based on the expected-number-of-receptions information when the predetermined time passes, the predetermined time condition is set based on the expected-number-of-receptions information.

(((6))) The information processing apparatus according to (((5))),
wherein the set predetermined time condition is canceled when the identified number of items of image data reaches the expected number.

(((7))) The information processing apparatus according to any one of (((1))) to (((6))),
wherein, if a transmission time of the image data with lower reliability than the reception information is acquired, the processor is configured to use the transmission time to determine to transmit the first information instead of transmitting the second information.

(((8))) The information processing apparatus according to (((7))),
wherein the processor is configured to transmit the first information instead of transmitting the second information when a condition related to the transmission time of the image data is further satisfied.

(((9))) The information processing apparatus according to (((7))) or (((8))), wherein the first information is transmitted instead of the second information when the transmission time of the image data has not passed the predetermined time.

(((10))) A program causing an information processing apparatus to execute a process, the process comprising:

acquiring reception information as information indicating a reception date and a reception time of transmitted image data;

transmitting first information, serving as information including the reception date in the reception information, to a storage destination if the reception time in the acquired reception information has not passed a predetermined time, and transmitting second information, serving as information including any date on or after a following day of the reception date, to the storage destination if the reception time has passed the predetermined time, the first information and the second information each serving as information indicating a storage location in the storage destination where the image data is stored when the image data is transferred to the storage destination; and transmitting the first information instead of transmitting the second information when a predetermined time condition set based on communication status information is satisfied during transferring of the image data if the reception time has passed the predetermined time and the communication status information indicating a communication status during reception of the image data is acquired.

What is claimed is:

1. An information processing apparatus comprising:

a processor configured to:

acquire reception information as information indicating a reception date and a reception time of transmitted image data;

transmit first information, serving as information including the reception date in the reception information, to a storage destination if the reception time in the acquired reception information has not passed a predetermined time, and transmit second information, serving as information including any date on or after a following day of the reception date, to the storage destination if the reception time has passed the predetermined time, the first information and the second information each serving as information indicating a storage location in the storage destination where the image data is stored when the image data is transferred to the storage destination; and transmit the first information instead of transmitting the second information when a predetermined time condition set based on communication status information is satisfied during transferring of the image data if the reception time has passed the predetermined time and the communication status information indicating a communication status during reception of the image data is acquired.

2. The information processing apparatus according to claim 1, wherein the communication status information is communication congestion information indicating a congestion status of communication during the reception of the image data.

3. The information processing apparatus according to claim 2, wherein the communication congestion information includes information indicating a congestion level, and wherein, if the information indicating the congestion level indicates a high congestion level, the predetermined time condition is relaxed, as compared with when the information indicating the congestion level indicates a low congestion level.

4. The information processing apparatus according to claim 1, wherein the communication status information is expected-number-of-receptions information indicating an expected number as a number of items of the image data expected to be received.

5. The information processing apparatus according to claim 4, wherein, if a number of items of image data identified from the acquired reception information is below the expected number based on the expected-number-of-receptions information when the predetermined time passes, the predetermined time condition is set based on the expected-number-of-receptions information.

6. The information processing apparatus according to claim 5, wherein the set predetermined time condition is canceled when the identified number of items of image data reaches the expected number.

7. The information processing apparatus according to claim 1, wherein, if a transmission time of the image data with lower reliability than the reception information is acquired, the processor is configured to use the transmission time to determine to transmit the first information instead of transmitting the second information.

8. The information processing apparatus according to claim 7, wherein the processor is configured to transmit the first information instead of transmitting the second information when a condition related to the transmission time of the image data is further satisfied.

9. The information processing apparatus according to claim 7, wherein the first information is transmitted instead of the second information when the transmission time of the image data has not passed the predetermined time.

10. The information processing apparatus according to claim 8, wherein the first information is transmitted instead of the second information when the transmission time of the image data has not passed the predetermined time.

11. A non-transitory computer readable medium storing a program causing an information processing apparatus to execute a process, the process comprising:

acquiring reception information as information indicating a reception date and a reception time of transmitted image data;

transmitting first information, serving as information including the reception date in the reception information, to a storage destination if the reception time in the acquired reception information has not passed a predetermined time, and transmitting second information, serving as information including any date on or after a following day of the reception date, to the storage destination if the reception time has passed the predetermined time, the first information and the second information each serving as information indicating a storage location in the storage destination where the image data is stored when the image data is transferred to the storage destination; and transmitting the first information instead of transmitting the second information when a predetermined time condition set based on communication status information is satisfied during transferring of the image data if the reception time has passed the predetermined time and the communication status information indicating a communication status during reception of the image data is acquired.

12. An information processing method comprising:

acquiring reception information as information indicating a reception date and a reception time of transmitted image data;

transmitting first information, serving as information including the reception date in the reception information, to a storage destination if the reception time in the acquired reception information has not passed a predetermined time, and transmitting second information, serving as information including any date on or after a following day of the reception date, to the storage destination if the reception time has passed the predetermined time, the first information and the second information each serving as information indicating a storage location in the storage destination where the image data is stored when the image data is transferred to the storage destination; and transmitting the first information instead of transmitting the second information when a predetermined time condition set based on communication status information is satisfied during transferring of the image data if the reception time has passed the predetermined time and the communication status information indicating a communication status during reception of the image data is acquired.

* * * * *